United States Patent
Savchenkov et al.

(10) Patent No.: US 6,922,497 B1
(45) Date of Patent: Jul. 26, 2005

(54) WHISPERING GALLERY MODE RESONATORS BASED ON RADIATION-SENSITIVE MATERIALS

(75) Inventors: Anatoliy Savchenkov, La Crescenta, CA (US); Lutfollah Maleki, Pasadena, CA (US); Vladimir Ilchenko, La Canada, CA (US); Timothy A. Handley, Santa Barbara, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/441,946

(22) Filed: May 19, 2003

Related U.S. Application Data

(60) Provisional application No. 60/381,588, filed on May 17, 2002.

(51) Int. Cl.[7] .............................. G02B 6/26; G02B 6/42
(52) U.S. Cl. .............................. 385/15; 385/27; 385/28; 372/32; 372/92; 372/96; 372/108
(58) Field of Search .............................. 372/32, 92, 96, 372/108; 385/15, 27, 28

(56) References Cited

U.S. PATENT DOCUMENTS

| | | | | |
|---|---|---|---|---|
| 6,009,115 | A | * 12/1999 | Ho | 372/92 |
| 6,389,197 | B1 | 5/2002 | Iltchenko et al. | 385/28 |
| 6,473,218 | B1 | 10/2002 | Maleki et al. | 359/245 |
| 6,487,233 | B2 | 11/2002 | Maleki et al. | 372/108 |
| 6,490,039 | B2 | * 12/2002 | Maleki et al. | 356/436 |
| 6,567,436 | B1 | 5/2003 | Yao et al. | 372/32 |
| 6,718,083 | B2 | * 4/2004 | Lopes et al. | 385/16 |
| 2002/0018611 | A1 | 2/2002 | Maleki et al. | 385/15 |
| 2002/0044739 | A1 | * 4/2002 | Vahala et al. | 385/30 |

* cited by examiner

*Primary Examiner*—Akm Enayet Ullah
*Assistant Examiner*—Daniel Petkovsek
(74) *Attorney, Agent, or Firm*—Fish & Richardson P.C.

(57) ABSTRACT

Whispering gallery mode (WGM) optical resonators formed of radiation-sensitive materials to allow for permanent tuning of their resonance frequencies in a controlled manner. Two WGM resonators may be cascaded to form a composite filter to produce a second order filter function where at least one WGM resonator is formed a radiation-sensitive material to allow for proper control in the overlap of the two filter functions.

5 Claims, 9 Drawing Sheets

FIG. 3
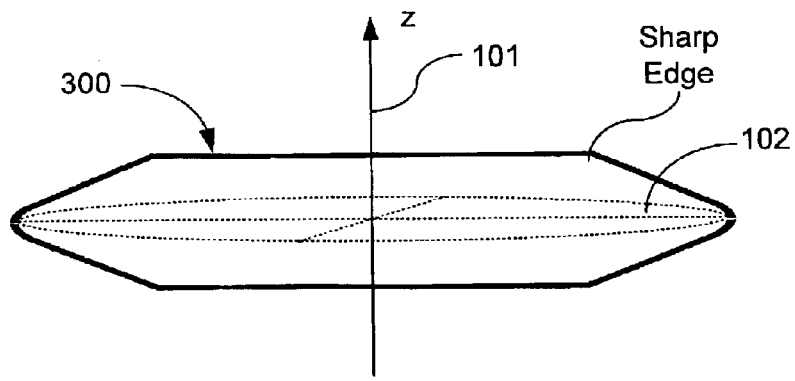
FIG. 4A　　　　　FIG. 4B
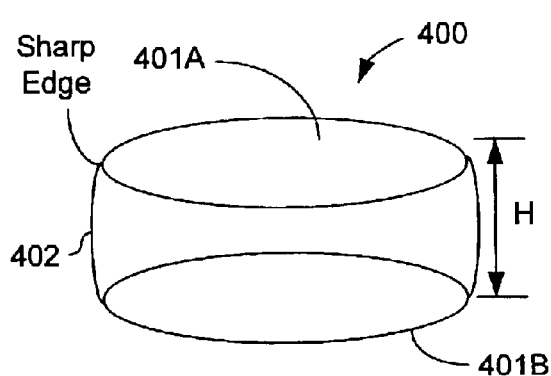 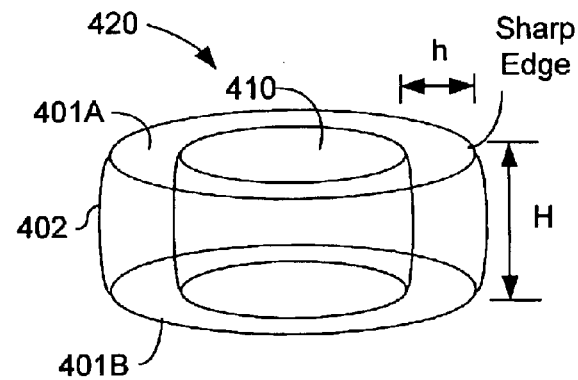
FIG. 5A　　　　　FIG. 5B
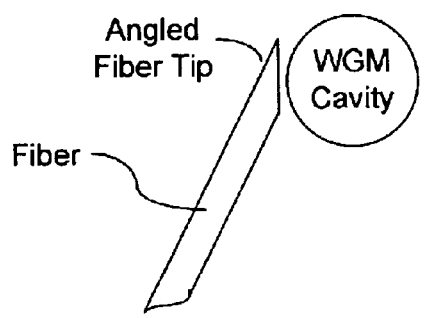 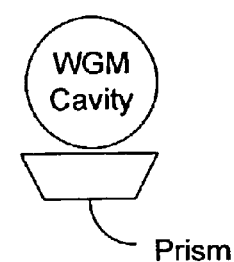

US 6,922,497 B1

WHISPERING GALLERY MODE RESONATORS BASED ON RADIATION-SENSITIVE MATERIALS

This application claims the benefit of U.S. Provisional Application No. 60/381,588 entitled "Engineering optical high-Q microcavities spectrum by UV light" and filed on May 17, 2002, the entire disclosure of which is incorporated herein by reference as part of this application.

STATEMENT REGARDING FEDERALLY SPONSORED RESEARCH

The systems and techniques described herein were made in the performance of work under a NASA contract, and are subject to the provisions of Public Law 96-517 (35 USC 202) in which the Contractor has elected to retain title.

BACKGROUND

This application relates to optical resonators and cavities, and more specifically, to optical whispering-gallery-mode ("WGM") resonators and cavities and their fabrication methods.

A dielectric material may be shaped to form an optical whispering-gallery-mode ("WGM") resonator which supports a special set of resonator modes known as whispering gallery ("WG") modes. These modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the sphere's equator. The resonator dimension is generally much larger than the wavelength of light so that the optical loss due to the finite curvature of the resonators is small. As a result, a high quality factor, Q, may be achieved in such resonators. Some microspheres with sub-millimeter dimensions have been demonstrated to exhibit very high quality factors for light waves, ranging from 1000 to $10^9$ for quartz microspheres. Hence, optical energy, once coupled into a whispering gallery mode, can circulate within the WGM resonator with a long photon life time.

Such high Q values are generally difficult and expensive to obtain in conventional Fabry-Perot optical resonators formed with mirrors. The capability of producing high Q values makes the WGM resonators useful for many optical applications, including optical filtering, optical delay, optical sensing, lasers, and opto-electronic oscillators.

SUMMARY

This application includes implementations of optical WGM resonators formed of radiation-sensitive materials to allow for permanent tuning of the resonance frequency of a WGM resonator in a controlled manner without changing the geometry of the resonator by exposing the resonator to radiation of a selected wavelength. In one implementation, a dielectric material is provided, which transparent to radiation of wavelengths in a first radiation spectral range and changes a refractive index of the material when exposed to radiation at a wavelength in a second radiation spectral range. A micro resonator is fabricated from the dielectric material to support whispering gallery modes for radiation in the first radiation spectral range. The resonator is then exposed to the radiation at the wavelength in the second radiation spectral range to modify the refractive index of the resonator until the refractive index is changed to a desired value at which the resonator produces a desired resonator spectrum in the first spectral range. In addition, the exposure may be controlled to separate a temporal change in the refractive index caused by thermal heating by the exposure from a change in the refractive index caused by a radiation sensitivity to light at the second radiation spectral range.

Hence, a device may be advantageously formed of an optical resonator which is configured to support whispering gallery modes and is made of a UV-exposed Ge-doped silica which has a refractive index different from a refractive index of an identical Ge-doped silica which is not exposed to UV light. This device may be conveniently tuned to a desired resonance frequency required by a specific application.

As another feature of this application, two WGM resonators may be cascaded to form a composite filter to produce a second order filter function where at least one WGM resonator is formed a radiation-sensitive material. Hence, the relative spectral position of the two WGM resonators may be adjusted in a controlled manner to achieve a proper overlap of the two filter functions. In one implementation, for example, a monitor beam is coupled through the two coupled WGM optical resonators to produce an optical transmission beam. The resonator formed of the radiation-sensitive material is exposed to the radiation beam to modify the refractive index of the resonator. The spectrum of the optical transmission beam is monitored during the exposure to measure a line shape of the spectrum. The exposure to the radiation beam is terminated when the line shape is changed to a desired line shape.

These and other implementations are now described in greater details as follows.

BRIEF DESCRIPTION OF THE DRAWINGS

FIGS. 1, 2, 3, 4A, and 4B illustrate various exemplary resonator configurations that support whispering gallery modes and are formed of radiation-sensitive materials for spectral tuning.

FIGS. 5A and 5B illustrate two evanescent coupling examples.

DETAILED DESCRIPTION

Figure 1:
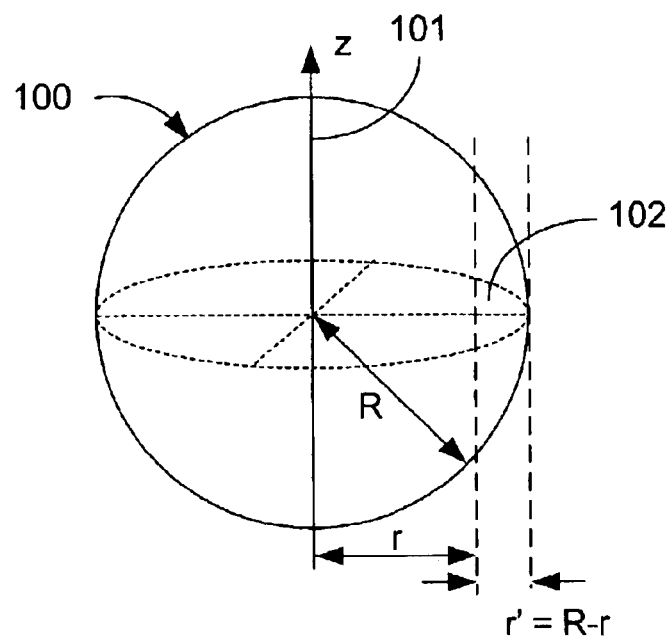

Some applications for WGM resonators may require a WGM resonator to exhibit specific spectral properties. The dielectric material, the shape and dimension of the resonator, the conditions of the surroundings of the resonator, and the coupling of the optical coupler for the resonator may affect the spectral properties of a particular WGM resonator. For a given dielectric material under known surrounding conditions, a resonator may be tuned to alter its spectral properties by changing the shape of the resonator through, e.g., stretching or compressing the resonator. Precise control of such tuning may be technically difficult, especially for mechanical tuning mechanisms in part because WGM resonators are small with a dimension from tens of microns to hundreds of microns.

This application provides techniques for permanently tuning the spectral properties of the a WGM resonator after it is fabricated and without changing the geometry of the resonator. In one implementation, a dielectric material transparent to radiation of wavelengths in a first radiation spectral range is configured to change a refractive index of the material when exposed to radiation at a wavelength in a second radiation spectral range. The first spectral range may be any range in which the resonator is to be operated, such as wavelengths around 1550 nm for optical communications. The second spectral range is different and separate from the first spectral range, such as the UV range or other suitable spectral ranges different from the spectral range of the light in WG modes. A micro resonator is fabricated from the dielectric material to support whispering gallery modes for radiation in the first radiation spectral range. Next, the fabricated resonator is exposed to radiation at the wavelength in the second radiation spectral range to modify the refractive index of the resonator until the refractive index is changed to a desired value at which the resonator produces a desired resonator spectrum in the first spectral range.

The above change of the index by exposure to the radiation is generally permanent. This may be achieved by doping the dielectric material with radiation-sensitive ions, e.g., a Ge-doped silica that is sensitive to UV light. Under this approach, the change in the index of the resonator is controlled by controlling the exposure. A number of advantages can be achieved with this approach. For example, the permanent nature of the change in the index avoids the technical difficulties of maintaining the precise amount of stretching or compression on the resonator in typical mechanical approaches. Different WGM resonators may be tuned with this approach to have one or more common resonator frequencies. A WGM resonator may be so tuned to a desired resonator frequency in a systematic and controllable manner. In addition, different resonant frequencies of such a resonator can be tuned at the same time as a whole so that there is no need for correcting relative shifts of spectral lines. This approach is simple without complex mechanical controls or chemical processing steps. The tuning may be monitored and controlled with desired precision.

Figure 2:
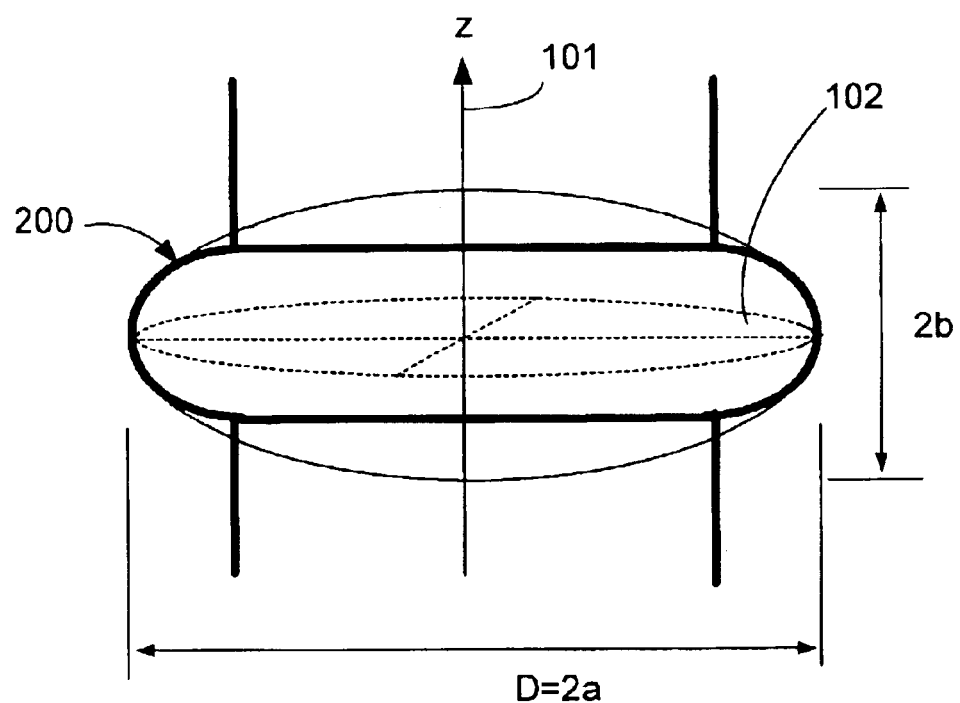

In general, radiation-sensitive WGM resonators may be formed in various geometries. FIGS. 1, 2, and 3 illustrate three exemplary geometries for implementing the WGM resonators with radiation-sensitive dielectric materials.

FIG. 1 shows a spherical WGM resonator 100 which is a solid dielectric sphere formed of a radiation-sensitive material. The sphere 100 has an equator in the plane 102 which is symmetric around the z axis 101. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheriodal microresonator 200 formed of a radiation-sensitive material. This resonator 200 may be formed by revolving an ellipse (with axial lengths a and b) around the symmetric axis along the short elliptical axis 101 (z). The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

FIGS. 4A and 4B show a disk-shaped WGM resonator 400 and a ring-shaped WGM resonator 420, respectively, with radiation-sensitive materials. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 3, 4A, and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

An optical coupler is generally used to couple optical energy into or out of the WGM resonator by evanescent coupling. FIGS. 5A and 5B show two exemplary optical couplers engaged to a WGM resonator with a UV-sensitive material according to this application. The optical coupler may be in direct contact with or separated by a gap from the exterior surface of the resonator to effectuate the desired critical coupling. FIG. 5A shows an angle-polished fiber tip as a coupler for the WGM resonator. FIG. 5B shows a micro prism as a coupler for the WGM resonator. Other evanescent couplers such as a coupler formed from a photonic bandgap material may be used.

In WGM resonators with uniform indices, a part of the electromagnetic field of the WG modes is located at the exterior surface of the resonators. A gap between the optical coupler and the WGM resonator with a uniform index is generally needed to achieve a proper optical coupling. This gap is used to properly "unload" the WG mode. The Q-factor of a WG mode is determined by properties of the dielectric material of the WGM resonator, the shape of the resonator, the external conditions, and strength of the coupling through the coupler (e.g. prism). The highest Q-factor may be achieved when all the parameters are properly balanced to achieve a critical coupling condition. In WGM resonators with uniform indices, if the coupler such as a prism touches the exterior surface of the resonator, the coupling is strong and this loading can render the Q factor to be small. Hence, the gap between the surface and the coupler is used to reduce the coupling and to increase the Q factor. In general, this gap is very small, e.g., less than one wavelength of the light to be coupled into a WG mode. Precise positioning devices such as piezo elements may be used to control and maintain this gap at a proper value.

One convenient implementation of the radiation-sensitive material for any of above WGM resonator configurations is to use a UV-sensitive material to fabricate the resonator. After the resonator is fabricated, the resonator is exposed to the UV light at the proper wavelength to change the index. Ge-doped silica, for example, has low optical losses at about 1550 nm and a high sensitivity to UV light. It is possible to shift the index of such a silica by an amount of about $10^{-2}$ to $10^{-4}$ with proper amount of exposure to the UV light at about 351 nm. In the frequency domain, an eigen frequency of 200 THz of a WGM resonator may be shifted from 10 to 1000 GHz. For a microsphere resonator with a diameter of about 1000 microns, This shift is close to the free spectral range of the resonator. Hence, with this large tuning range comparable to the free spectral range, it is possible to design and engineer the eigen frequency of a WGM resonator to be at any desired frequency.

Figure 6:
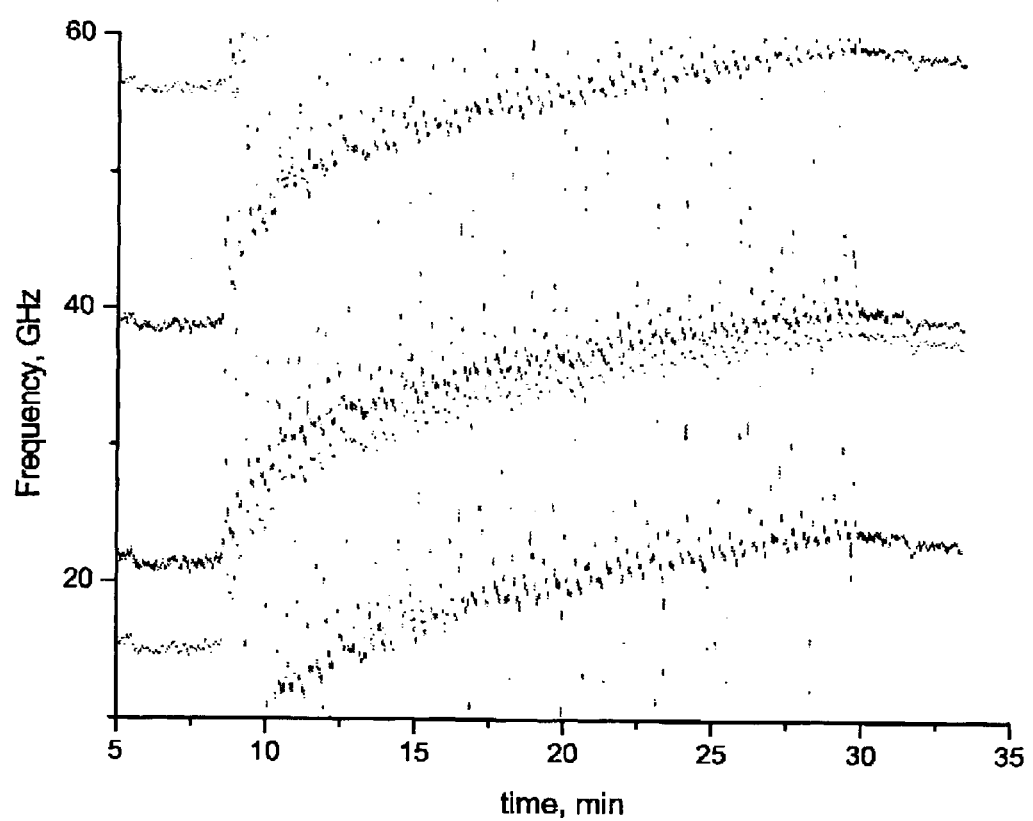
FIG. 6 shows frequency shifts in the resonance frequency as a function of exposure time for a WGM microsphere resonator formed of Ge-doped silica caused by exposure to UV light at 351 nm.

FIG. 6 shows measured resonance frequency shifts in GHz as a function of the exposure time for exposing a Ge-doped silica microsphere resonator to a UV laser beam of about 600 mW at 351 nm. A maximum of 18 GHz in the frequency shift was measured in a resonator formed of uniform Ge-doped silica. This is greater than one non-azimutheal free spectral range of a microsphere resonator with a diameter greater than 100 microns.

Figure 7:
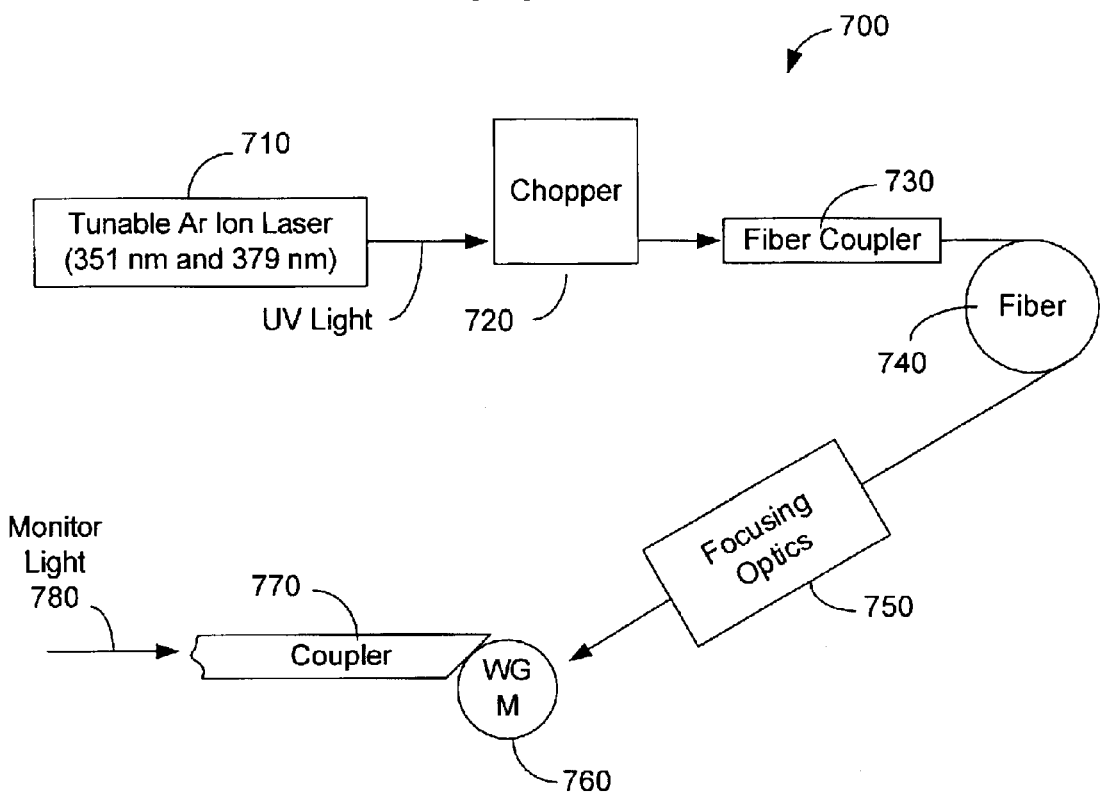
FIG. 7 shows an exemplary system for permanently shifting the resonance frequency of a WGM resonator formed of a radiation-sensitive material.

FIG. 7 shows an exemplary system 700 for tuning the spectral properties of a WGM resonator 760 by radiation exposure. A radiation source 710 such as a UV laser is provided to produce the radiation at the desired wavelength to which the material of the resonator 760 is sensitive. For UV-sensitive Ge-doped silica as the resonator material, a tunable CW Ar ion laser may be used to produce UV light at wavelengths of 351 nm and 379 nm. Ge-doped silica has a maximum sensitivity to UV light at about 334 nm where its change in the refractive index reaches maximum. At 351 nm, the Ge-doped silica shows a sufficient UV sensitivity for purpose of permanently tuning the resonator frequency of this application. The sensitivity of Ge-doped silica at 379 nm is low in comparison to the sensitivity at 351 nm. As described below, the 379-nm light is used to induce a temporary shift in the resonator frequency due to heating by optical absorption so that the permanent frequency shift due to the UV sensitivity of the resonator 760 can be properly monitored.

Figure 8:
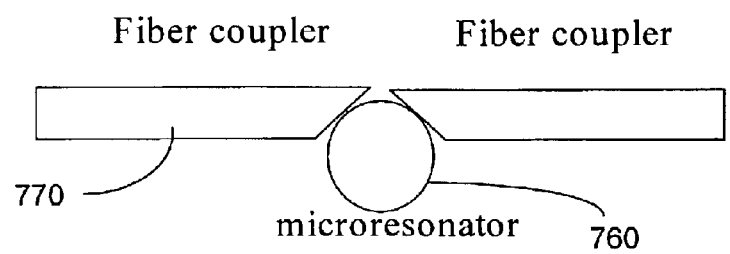
FIG. 8 shows input and output couplings for the WGM resonator.

The system 700 includes a chopper 720 to periodically turn on and off the UV light to the resonator 760 to vary the duration of the exposure, e.g., from 2 to 60 seconds, to monitor the shift of the resonator frequency mainly due to the thermal effect caused by exposure to the 371-nm UV light. A separate light source is used to produce a monitor light beam 780 at a spectral range different from UV at which the resonator 760 support WG modes. An optical coupler 770 such as a fiber coupler or a prism coupler may be used to couple the monitor light 780 into a WG mode in the resonator 760. A separate output coupler may be used to couple the light at the wavelength of the monitor light 780 out of the resonator 760 for measurements as shown in FIG. 8. The spectrum of the resonator at the wavelength of the monitor light 780 is monitored to measure the frequency shift of the resonator frequency. As an example, a tunable 1550-nm diode laser may be used to produce the monitor light 780 at about 1550 nm. To control the frequency shift of the this diode laser, an erbium-doped fiber amplifier, and a Fabry-Perot cavity as a frequency reference marker may be used to stabilize the diode laser. This 1550-nm light can be used to measure the spacing between the spectral lines.

As illustrated in FIG. 7, a fiber coupler 730 may be used to couple the UV light from the light source 710 and the chopper 720 into a multimode fiber 740. A focusing optical element 750 may be coupled at the opposite end of the fiber 740 to focus the UV light to the WGM resonator 760. The output facet of the fiber 740 may be a convex surface to effect a focusing lens as the element 750. The output light from the resonator 760 is sent to a photodiode that produces a spectrum of the resonator 760 as the laser frequency of the monitor light 780 is tuned. The output light exits the microsphere at an angle of about 5 to 15 degrees from the direction of the incident light, so that the two beams are physically separated.

The exposure to the UV radiation at 351 nm permanently changes the chemical structure of Ge-doped silica and thus the index of the resonator 760. It is recognized that the UV light also heats up the resonator 760 and causes a temporary thermal shift in the resonator frequency. Thus, both UV sensitivity of the Ge-doped silica and the temporary thermal effect cause the frequency shift of WGMs. The instantaneous effect of heating may be stronger than the effect due to UV-assisted permanent shifts.

The frequency shifts due to the two effects may be separated in order to accurately monitor and measure the permanent shift by the UV sensitivity. One method, for example, is to alternately open and close the chopper 720 at intervals sufficiently long, e.g., several to tens of seconds, to allow the resonator 760 to cool down so that the frequency shift caused by transient thermal effects can be separated from that caused by a permanent chemical change.

In another method, the UV light at 379 nm is first used to illuminate the resonator 760 to primarily cause the thermal shift in the resonator frequency. At this wavelength, the permanent frequency shift due to the UV sensitivity is small relative to the thermal shift. After the thermal effect reaches a stable state, the UV light is tuned from 379 nm at which the UV sensitivity is low to 351 nm at which the UV sensitivity is high. The additional shift in the resonator frequency after tuning the UV light to 351 nm is primarily caused by the UV sensitivity. After the additional frequency shift reaches a desired value, the UV light is turned off.

This method may be implemented by first focusing the 351-nm UV light to a location where the resonator 760 is to be placed and then tuning the UV light to 379 nm and placing the resonator 760 at the location to receive the illumination of the 379-nm light. The spot location of the 379-nm light on the resonator 760 is adjusted so that the thermal shift is at its maximum. At this beam location on the resonator 760, the permanent shift by the 351-nm light is also at its maximum. The 379-nm light is chopped with varying periods, e.g., from 2 to 60 seconds, to monitor the thermal shifts. Next, the UV light is tuned back to 351 nm to cause the permanent frequency shift. The spectrum of the resonator 760 is monitored and the 351-nm light is turned off when the permanent shift reaches the desired value.

Prior to the above radiation exposure to modify the resonator frequency, the WGM resonator 760 is fabricated. This may be done by a number of fabrication techniques. For example, a Ge-doped silica rod may be stretched into a filament under a heated condition, e.g., by using a hydrogen-oxygen microburner to stretch the rod into a filament of about 30 microns. Subsequently, the tip of the filament may be heated by, e.g., using a flame from a torch, to form a sphere as the resonator 760. Such a Ge-doped silica rod may be a germanate glass optical fiber with core material containing 19–20 molar percent of germanium oxide.

In another example, a pure silica sphere may be covered by a small amount of germanium oxide powder. The sphere is subsequently heated to a controlled temperature to melt the germanium oxide without melting the silica sphere. The melted germanium oxide forms a thin coating over the surface of the sphere. A small amount of germanium oxide diffuses below the surface of silica to form a thin shell of photosensitive material. The above process may be repeated many times to produce-a germanium oxide-coated/doped spheres of sufficient photosensitivity for tuning the resonator frequency by UV exposure.

Generally speaking, a single WGM resonator produces a Lorentzian-shaped filter function. However, in certain optical systems or applications, it is desirable to have a relatively flat spectral passband or a transmission with a sharp roll-off edge. It is difficult to use a single WGM resonator in such applications despite of many advantages of WGM resonators. Two or more WGM resonators, however, may be cascaded in an optical path to sequentially filter an input optical signal to produce a non-Lorentizian spectral shape with flatter transmission and improved rejection of the out of band spectral components. In particular, two sequentially coupled microcavities may be tuned relative to each other to have their resonator frequencies to be close to one anther to form a two-cavity composite filter with a nearly top-hat shaped second order filter function. The above described tuning of the resonator frequency with a real-time monitoring provides a method for precise tuning resonances in two WGM resonators with at least one resonator formed from a UV-sensitive material into close proximity so that their uncoupled resonance curves would overlap in the frequency domain.

Figure 9:
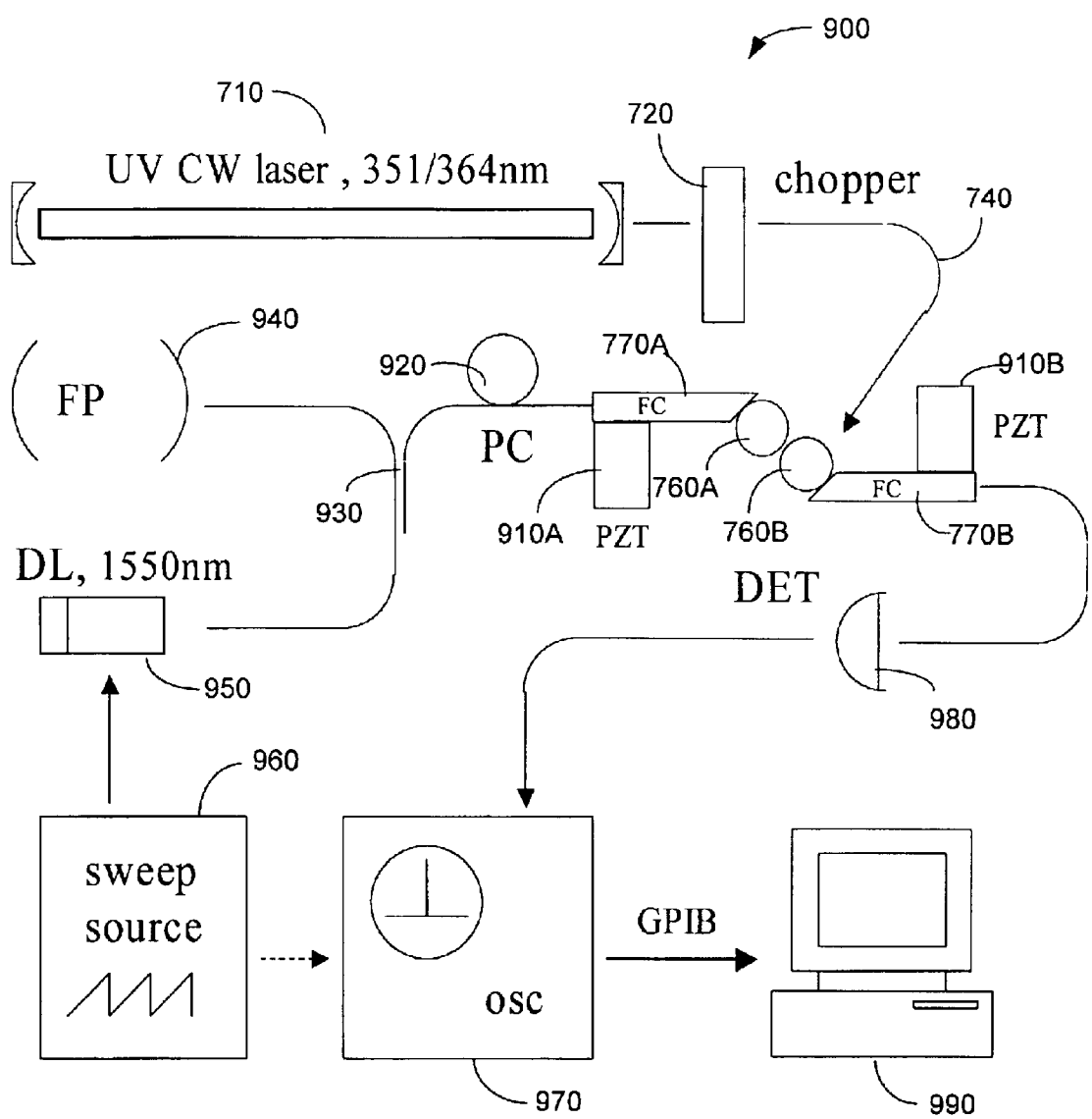
FIG. 9 shows an exemplary system for assembling a composite filter formed of two cascaded WGM resonators with a spectrum-monitoring mechanism.

FIG. 9 shows a system 900 for assembling and tuning a composite WGM filter with two cascaded WGM resonators 760A and 760B. In this implementation, only one of the two resonators 760A and 760B is formed of a UV-sensitive material and its resonator frequency can be tuned by permanently changing the index by UV light. For example, the first resonator 760A may be formed of a material whose index does not change with the UV light and its resonator frequency is essentially fixed. The second resonator 760B is formed of a UV sensitive material such as Ge-doped silica and its resonator frequency can be tuned relative to the resonator frequency of the first resonator 760A. The two resonators 750A and 760B are placed close to each other to effectuate optical coupling therebetween so that light in the first resonator 760A can be coupled into the second resonator 760B. Notably, the equators of the cavities 760A and 760B are placed in a substantially the same plane to allow for coupling via the evanescent field. Two optical couplers 770A and 770B are respectively coupled to the resonators 760A and 760B as optical input and output ports, respectively. Hence, light received from the coupler 770A is coupled into the resonator 760A, then to the resonator 760B, and finally to the coupler 770B as a filtered output. Any suitable optical coupler may be used. FIG. 9 shows angle-polished fiber couplers as an example. Couplers and resonators may be placed on miniature PZT translators 910A and 910B to allow for adjustment of their relative positions to manage the coupling. In general, any suitable positioning devices may be used to replace the PZT translators. When the resonators 760A and 760B are properly tuned and positioned, the input light in the coupler 770A may pass through both resonators with less than a 3 dB fiber-to-fiber loss.

The system 900 also includes the monitor light source 950 such as a tunable diode laser at 1550 nm to produce the input probe light to the input coupler 770A, a laser stabilization system for stabilizing the laser frequency of the laser 950, the UV light source 710 for tuning the resonator 760B, and an optical detector for receiving the filtered output from the output coupler 770B. The frequency of the laser diode 950 may be current modulated by with a sawtooth signal from a signal generator 960. To increase the laser power, an erbium-doped fiber amplifier may be placed at the output of the laser 950. One part of this output may be split and coupled into a Fabry-Perot resonator 940 as part of the laser stabilization system with a FSR of about 20 GHz. The resonator 940 serves as a reference to correct for any laser frequency drift, and for measuring the spacing between resonance lines of the WGM cavity. The remaining part of radiation from the erbium-doped fiber amplifier is fed into the coupler 770A such as an angle-polished fiber and is coupled into the first resonator 760A. Since the two resonators are placed close to each other to allow for light coupling, the light in the resonator 760A is coupled to the resonator 760B. In turn, the light in the resonator 760B is coupled by the output coupler 770B to an optical detector such as a photodiode 980. The detector output from the detector 980 is sent into an oscillator 970 to display the signal based on the triggering signal from the sweep source 960. Both the signals from the detector 980 and the sweep source 960 are stored and processed by a signal processor 990 such as a computer so that a plot of current versus time can be obtained as the frequency spectrum of the composite filter formed of the resonators 760A and 760B. As in FIG. 7, the fiber 740 with a convex tip may be used to focus the output of the UV argon-ion laser 710 onto the surface of the UV-sensitive Ge-doped silica resonator 760B to allow for a permanent shift of the resonator modes in order to adjust the relative resonator frequencies of the resonators 760A and 760B to form a desired second order output spectrum.

In general, any WGM resonator geometries may be used for the resonators 760A and 760B, including the spherical and toroidal resonators. Toroidal resonators as one class of non-spherical resonators are more difficult to fabricate, but have the advantage of a much sparser frequency spectrum. This occurs because microtorus WGMs with trajectories localized far from the equatorial plane of the cavity have high losses and, therefore, are effectively removed from the resonator's spectrum. The two resonators 760A and 760B may have the same resonator geometry, e.g., both being spherical or toroidal. Alternatively, they may have different resonator geometries, e.g., one being spherical and other being toroidal. In addition, the first resonator 760A may be made of a UV-sensitive material and the second resonator 760A may not be sensitive to UV. Although it is generally sufficient to have only one of the resonators 760A and 760B to be sensitive to UV for permanent tuning, it is also possible to make both resonators 760A and 760B to be tunable by UV light. In implementations, both resonators 760A and 760B may have approximately the same diameter. This is because the size of a cavity affects the quality of its resonance and cavities of similar sizes have similar quality factors. Hence, under this condition, the resonators 760A and 760B have similar Q factors. The mode structure of the resonator formed of pure silica appears to remain essentially unchanged within the resolution of the monitoring system, despite some exposure by small amounts of reflected and refracted UV light from the other UV-sensitive resonator. Pure silica does possess some very small UV photosensitivity; however it is much smaller than that of germanate glass and thus does not affect the tuning of the composite filter.

The differences in the size of the cavities is rather important because the Q factors and the spectral linewidths are affected by the resonator sizes. If resonances of two interacting cavities have differing spectral linewidths, the height of the narrower resonance will simply track the shape of the wider one as they are made to approach one another to be optically coupled. This is not useful for the filter application. Hence, it is desirable to produce spectral lines of both resonators of a similar width to achieve a complex spectral line structure.

In operation of the system 900 to set up and tune the composite filter with two resonators 760A and 760B, the setup is first adjusted to achieve the maximum efficiency in the photochemical process to shorten the time of tuning. The maximum efficiency occurs when the UV light is focused just inside the equator of a doped sphere (or a torus), at a point where the WG modes have a large field intensity. To achieve this, the argon-ion laser 710 is first tuned to the 379-nm line. Laser radiation at this wavelength affects the chemistry of the Ge-doped silica, but the process is relatively slow. Hence, the overall effect can be made negligible if the exposure time is kept short. Nonetheless, the absorbed UV in the material results in thermal expansion, which produces a visible shift in the resonance frequencies. If the position of the UV fiber 740 is adjusted to fine tune the beam location in the UV-sensitive resonator such that the thermal shift in the frequency spectrum is a maximum, then the UV light is properly focused at the point of the maximum efficiency.

After the above proper alignment, the UV laser 710 is tuned to 351 nm, which is the most photochemically efficient wavelength generated by the UV argon laser 710. To be sure that the system is stable, several data points were first taken with the UV beam blocked. Subsequently, a strobe technique is used by alternately opening and closing the shutter 720 at intervals of several seconds to track small changes of the WGM spectra. In this way, the frequency shift caused by the transient thermal effects can be separated from shifts caused by a permanent chemical change.

Figure 10A:
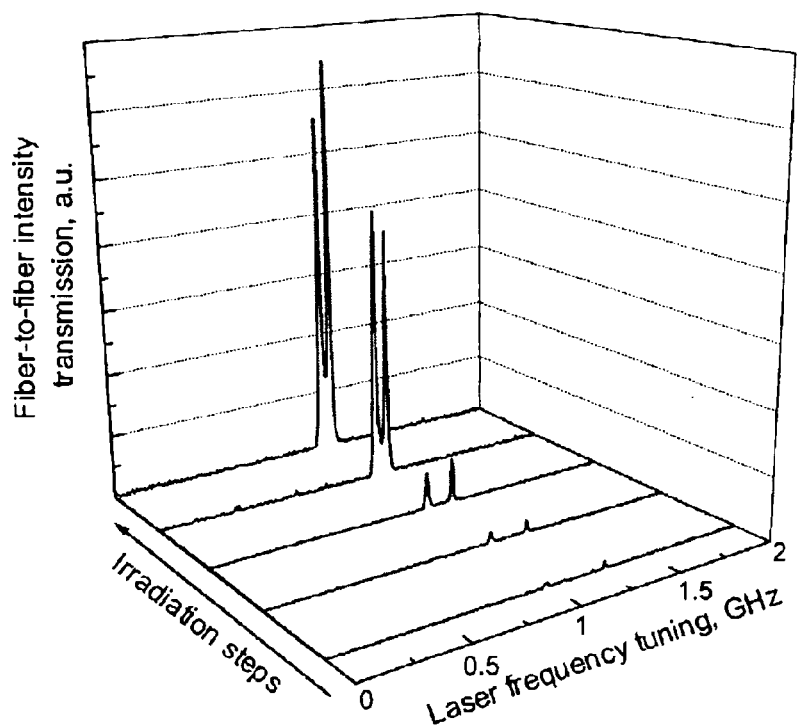
FIGS. 10A and 10B show measured spectral output from a composite filter of one microsphere WGM resonator of pure silica and one torus WGM resonator of Ge-doped silica using the system in FIG. 9.
Figure 10B:
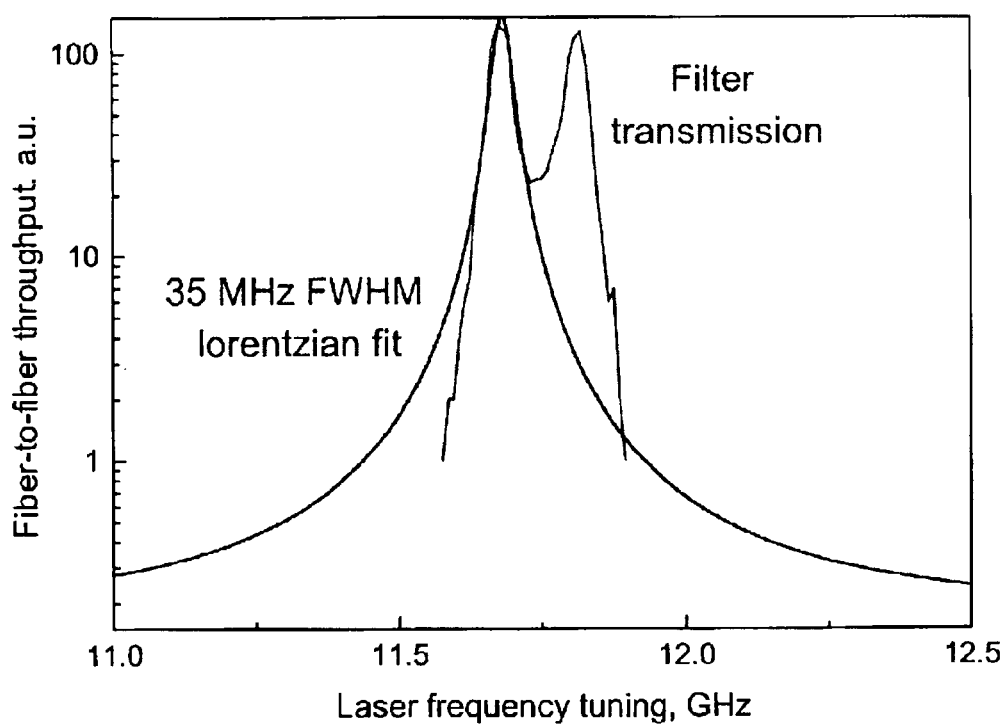

FIG. 10A depicts the final spectrum obtained in a composite filter where the first resonator 760A is a germanium-doped microtorus and the second resonator 760B is a pure-silica sphere. To highlight the filter performance, FIG. 10B shows the Lorentzian fit of the curve. This two-cavity composite filter has a much faster rolloff compared with that of the Lorentz line. On the other hand, the filter function of this particular composite filter does not look exactly like a second order filter function in part because of the overcoupling between the resonators.

Figure 11:
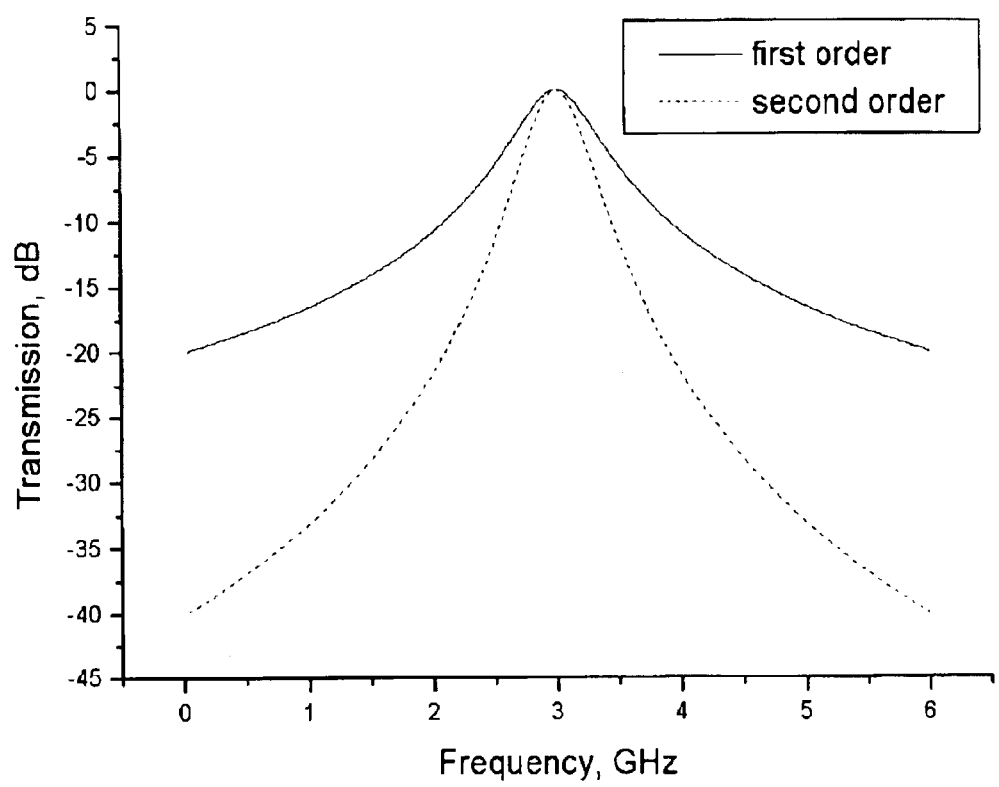
FIG. 11 illustrates a typical second order filter function of a composite filter with two cascaded WGM resonators.

When the overcoupling is removed, a second order filter function can be achieved. FIG. 11 shows a comparison of the first and second order filter functions. In general, two cascaded WGM resonators produce the following transmission function:

$$|T_{12}|^2 = \frac{\gamma^4}{\gamma^4 + \gamma^2(\omega_1 - \omega_2)^2 + 4(\omega - \omega_1)^2(\omega - \omega_2)^2},$$

where $\gamma$ is the common linewidth of the both resonators, $\omega_1$ and $\omega_2$ the resonance frequencies of the two resonators, respectively. It is assumed that phase shift $\phi$ caused by the coupling satisfies $\exp(i\phi)=-1$.

The above transmission of the composite filter suggests that that the transmission through is small for any frequency when the resonant frequencies of the modes are far from each other ($|\omega_1-\omega_2|^2 >> \gamma^2$). The transmission value has two resonance increases corresponding to the partial resonances of each mode. The transmission becomes close to unity when the mode frequencies are close to each other compared with the modes' width $\gamma$. In addition, the transmission for the off-resonance tuning is inversely proportional to $\gamma^4$, rather than $\gamma^2$ as for a single-resonator, Lorentzian filter. These spectral properties of the second-order filter function can be achieved with the two WGM resonators as shown in FIG. 9.

Figure 12A:
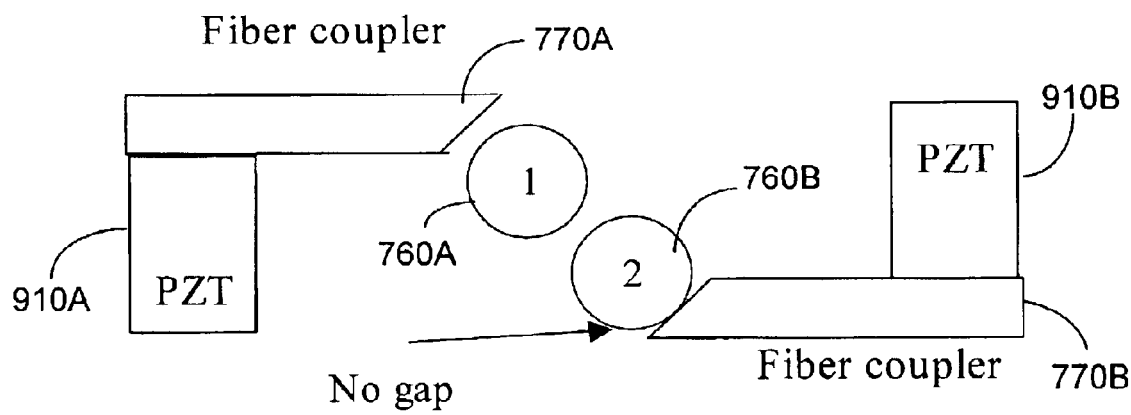
FIGS. 12A and 12B show one particular configuration of the two-resonator system in FIG. 9 and its corresponding spectral output.
Figure 12B:
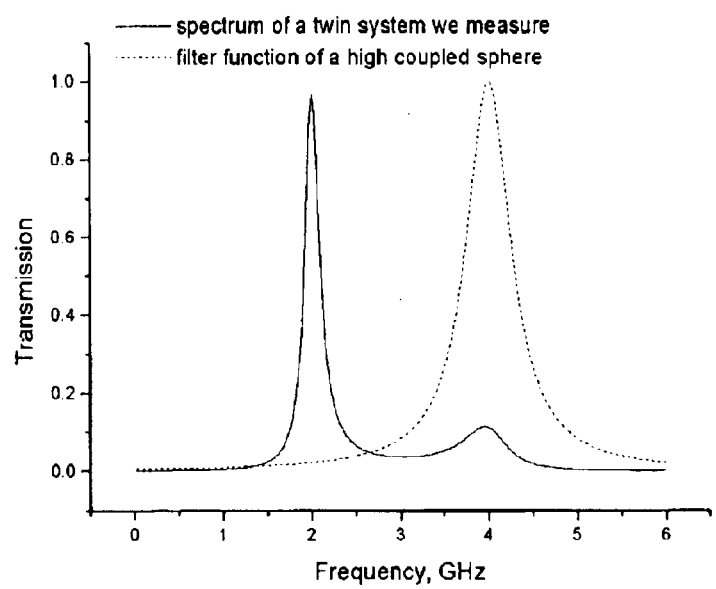
Figure 13A:
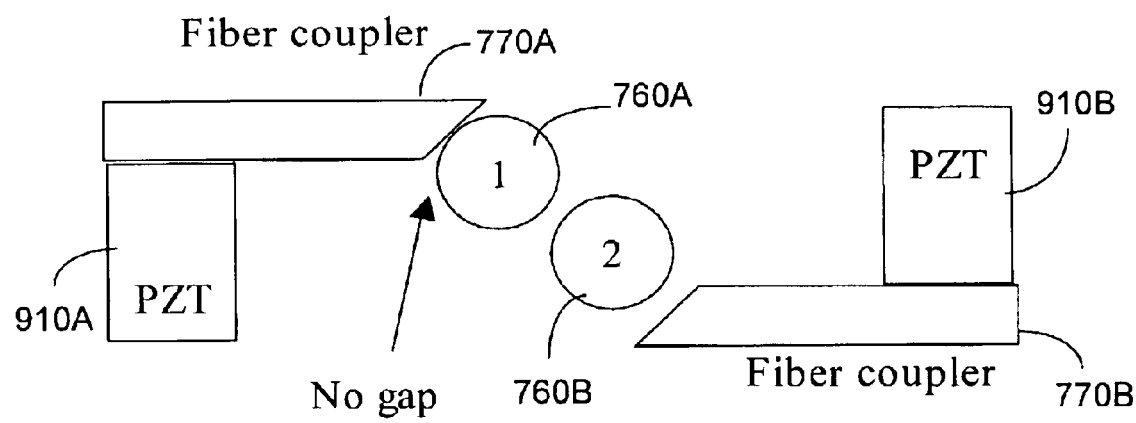
FIGS. 13A and 13B show another particular configuration of the two-resonator system in FIG. 9 and its corresponding spectral output.
Figure 13B:
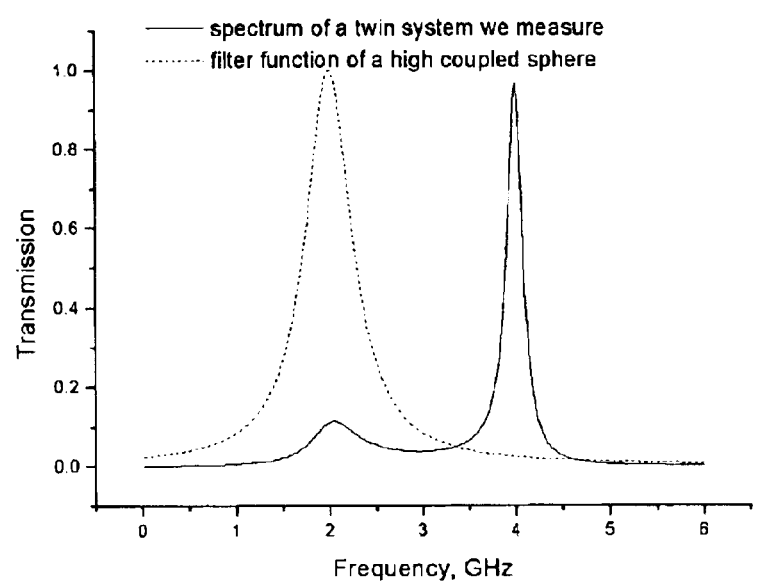

The two-resonator system in FIG. 9 may also be configured to monitor the spectrum of either one of the two resonators 760A and 760B by modifying the resonator-coupler coupling. FIG. 12A shows that a configuration where the spectrum of the first resonator 760A is monitored. In this configuration, the first resonator 760A is weakly coupled to the input coupler 770A to maintain a high Q factor, e.g., by having a gap whereas the second resonator 760B is strongly coupled to the output coupler 770B to achieve a low Q factor, e.g., by being in contact with the coupler 770B. Hence, the second resonator 760B and the output coupler 770B as a combination effectuate as a special output coupler for the resonator 760A. Accordingly, only the spectrum of the resonator 760A is shown in the output signal. FIG. 12B illustrates the output spectrum of the two-resonator system under this configuration. Similarly, FIGS. 13A and 13B show another configuration where the spectrum of the second resonator 760B is monitored.

In summary, only a few implementations are disclosed. However, it is understood that variations and enhancements may be made.

What is claimed is:

1. A method, comprising:
    optically coupling first and second optical resonators to allow for light coupling from the first optical resonator to the second optical resonator, wherein each optical resonator is configured to support whispering gallery modes, and wherein at least one of the first the second optical resonators is formed of a radiation-sensitive material which has a refractive index changes in response to a radiation beam at a wavelength different from light in the whispering gallery modes;
    coupling a monitor beam through the first and the second optical resonators to produce an optical transmission beam;
    exposing the one resonator formed of the radiation-sensitive material to the radiation beam to modify the refractive index of the resonator;

optically controlling the exposure of the radiation-sensitive material to the radiation beam to separate a change in the refractive index caused by a permanent change from a temporary thermal change in the radiation-sensitive material;

monitoring a spectrum of the optical transmission beam to measure a line shape of the spectrum; and terminating the exposure to the radiation beam when the line shape is changed to a desired line shape.

2. The method as in claim 1, wherein the optical control of the exposure of the radiation-sensitive material comprises:

periodically chopping the radiation beam with a period sufficiently long to allow the radiation-sensitive material to cool off during the period.

3. The method as in claim 1, wherein the optical control of the exposure of the radiation-sensitive material comprises:

directing a first radiation beam to the radiation-sensitive material at a wavelength different from a wavelength of the radiation beam prior to the exposure of the radiation-sensitive material to the radiation beam, wherein the radiation-sensitive material does not change significantly in the refractive index when exposed to the first radiation beam;

after the radiation-sensitive material is thermally stabilized under the first radiation beam, replacing the first radiation beam with the radiation beam;

measuring an additional frequency shift in the monitored spectrum caused by the exposure to the radiation beam; and terminating the exposure to the radiation beam when the additional frequency shift produces the desired line shape.

4. The method as in claim 1, further comprising:

providing a first optical coupler to evanescently couple the monitor beam into the first optical resonator and a second optical coupler to evanescently couple the monitor beam out of the second optical resonator for monitoring the spectrum; and adjusting a spacing between the first optical coupler and the first optical resonator to change a coupling strength between the first optical coupler and the first optical resonator.

5. The method as in claim 4, further comprising:

adjusting the spacing between the first optical coupler and the first optical resonator to weekly couple the first optical coupler to the first optical resonator with a high resonator quality factor; and adjusting the spacing between the second optical coupler and the second optical resonator to strongly couple the second optical coupler to the second optical resonator with a low resonator quality factor.

* * * * *